United States Patent
No

(10) Patent No.: US 9,080,623 B2
(45) Date of Patent: Jul. 14, 2015

(54) ELECTROMECHANICAL BRAKE SYSTEM

(71) Applicant: Su Hwan No, Pyeongtaek-si (KR)

(72) Inventor: Su Hwan No, Pyeongtaek-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 36 days.

(21) Appl. No.: 13/920,084

(22) Filed: Jun. 18, 2013

(65) Prior Publication Data

US 2014/0000993 A1 Jan. 2, 2014

(30) Foreign Application Priority Data

Jun. 29, 2012 (KR) ........................ 10-2012-0070846

(51) Int. Cl.
| | | |
|---|---|---|
| F16D 65/28 | (2006.01) | |
| F16D 55/226 | (2006.01) | |
| F16D 65/18 | (2006.01) | |
| F16D 66/00 | (2006.01) | |
| F16D 121/24 | (2012.01) | |
| F16D 125/40 | (2012.01) | |
| F16D 125/50 | (2012.01) | |
| F16D 127/06 | (2012.01) | |
| F16D 129/08 | (2012.01) | |

(52) U.S. Cl.
CPC .............. *F16D 55/226* (2013.01); *F16D 65/18* (2013.01); *F16D 2066/005* (2013.01); *F16D 2121/24* (2013.01); *F16D 2125/40* (2013.01); *F16D 2125/50* (2013.01); *F16D 2127/06* (2013.01); *F16D 2129/08* (2013.01)

(58) Field of Classification Search
USPC .............. 188/72.1, 72.7, 72.8, 156, 157, 158, 188/159, 162; 475/149, 152, 154, 156, 157
See application file for complete search history.

(56) References Cited

U.S. PATENT DOCUMENTS

| | | | | |
|---|---|---|---|---|
| 2,500,447 A | * | 3/1950 | Bitzer | 475/157 |
| 2,722,303 A | * | 11/1955 | Utz | 192/90 |
| 4,484,495 A | * | 11/1984 | Mason | 475/157 |
| 4,838,622 A | * | 6/1989 | Kircher et al. | 303/113.2 |
| 6,138,801 A | * | 10/2000 | Shirai et al. | 188/157 |
| 6,176,352 B1 | * | 1/2001 | Maron et al. | 188/1.11 E |
| 6,767,305 B2 | * | 7/2004 | Backes et al. | 475/149 |

(Continued)

FOREIGN PATENT DOCUMENTS

KR 10-2011-0125142 A 11/2011

OTHER PUBLICATIONS

Office Action dated Mar. 13, 2015 for Chinese Patent Application No. 201310263548.0.

*Primary Examiner* — Nicholas J Lane
(74) *Attorney, Agent, or Firm* — Ladas & Parry, LLP

(57) ABSTRACT

Disclosed herein is an electromechanical brake system includes a base carrier provided with a pair of pad plates for application of pressure to a disc, a caliper housing supported by the base carrier to be movable forward and backward to apply pressure to the pad plates, a pressing member including a ball nut installed at the caliper housing to convert rotational motion into rectilinear motion to apply pressure to the pad plates and a ball screw coupled to the ball nut, a force sensor installed at the ball nut to sense load produced by the ball nut, a motor to produce rotational force to operate the pressing member, and a speed reducer connected to a rotating shaft of the motor to transfer driving force to the pressing member, wherein the speed reducer may be adapted to change a reduction ratio depending on presence of load sensed by the force sensor.

6 Claims, 4 Drawing Sheets

(56) References Cited

U.S. PATENT DOCUMENTS

| | | | |
|---|---|---|---|
| 7,849,976 B2* | 12/2010 | Kawahara et al. | 188/1.11 E |
| 2005/0247528 A1* | 11/2005 | Schack et al. | 188/72.8 |
| 2006/0102438 A1* | 5/2006 | Bayer et al. | 188/156 |
| 2009/0223752 A1* | 9/2009 | Kim | 188/72.1 |
| 2011/0278109 A1* | 11/2011 | No | 188/72.6 |
| 2013/0087417 A1* | 4/2013 | Yu et al. | 188/72.3 |
| 2013/0299288 A1* | 11/2013 | Ryu et al. | 188/72.4 |

* cited by examiner

ELECTROMECHANICAL BRAKE SYSTEM

CROSS-REFERENCE TO RELATED APPLICATION

This application claims priority from Korean Patent Application No. 10-2012-0070846, filed on Jun. 29, 2012 in the Korean Intellectual Property Office, the disclosure of which is incorporated herein by reference in its entirety.

BACKGROUND

1. Field

Embodiments of the present invention relate to an electromechanical brake system provided with a speed reducer having a function of changing speed, and may thereby improve responsiveness by changing the reduction ratio depending on the condition of load in braking of a vehicle.

2. Description of the Related Art

As vehicles are evolving from hybrid vehicles to electric vehicles through fast development of electronics, a hydraulic brake system is also converted into an electromechanical brake system for driving of a parking brake. Such an electromechanical brake system is mounted to a common disc brake to function as a parking brake.

FIG. 1 is a view showing an electronic disc brake adopting a conventional electromechanical brake system.

Referring to FIG. 1, the electromechanical brake system includes a disc 1 to rotate with a wheel of a vehicle, a base carrier 10 at which a pair of pad plates 11 and 12 disposed on both sides of the disc 1 to apply pressure to the disc 1 is installed, a caliper housing 20 slidably installed at the base carrier 10 for application of pressure to the pair of the pad plates 11 and 12, a motor 50 to produce driving force, a speed reducer 40 to amplify the driving force produced by the motor 50, and a pressing member 30 to covert rotational force of the motor 50 from the speed reducer 40 into rectilinear motion to apply pressure to the pad plate 11.

The pad plates 11 and 12 may be divided into an inner pad plate 11 adjacent to the pressing member 30, and an outer pad plate 12 positioned at the opposite side of the inner pad plate 11. A body 23 for installation of the pressing member 30 is provided at one side of the caliper housing 20, and a downwardly curved finger 22 integrally connected to the body 23 is provided at the other side of the caliper housing 20 to press the outer pad plate 12 against the disc 1 when the caliper housing 20 slides.

The base carrier 10 is fixed to a vehicle body to prevent separate of the pad plates 11 and 12 and to guide movement of the pad plates 11 and 12 toward and away from the disc 1.

The pressing member 30 is provided with a ball screw 32 screw-coupled to a central rotating shaft of a carrier 43 of the speed reducer 40, which is described below, to receive rotational force of the motor 50, and a ball nut 31 coupled to the ball screw 32 to apply pressure to the inner pad plate 11 with rectilinear motion. A bearing 25 is installed inside the body 23 to support the ball screw 32.

The speed reducer 40 includes a sun gear 41 installed at a rotating shaft of the motor 50, a plurality of planetary gears 42 disposed around the sun gear 41 to engage with the sun gear 41, an internal gear 44 fixed outside of the planetary gears 42 to engage with the planetary gears 42, and the carrier 43 to connect shafts 42a of the planetary gears 42 to the pressing member 30.

That is, in the case of the electromechanical brake system as above, when the sun gear 41 is rotated by operation of the motor 50, the planetary gears 42 engaged with the fixed internal gear 44 revolve about the internal gear 44. Revolution of the planetary gears 42 is transferred to the ball screw 32 via the carrier 43 to allow the ball screw 32 to rotate at a reduced speed. When the ball screw 32 rotates, the ball nut 31 axially moves, applying pressure to the inner pad plate 11 to perform braking.

However, when braking is performed using the electromechanical brake 10 as above, the planetary gears 42 in contact with the fixed internal gear 44 revolve. Revolution of the planetary gears 42 is transferred to the ball screw 32 via the carrier 43, thereby reducing the rate of rotation. That is, the conventional electromechanical brake system is provided with the speed reducer 40 which does not allow change of speed, and thereby responsiveness thereof is degraded in applying and releasing the brake and fast control may be not be implemented with the conventional electromechanical brake system.

In addition, as torque of the motor 50 is amplified to produce axial force, noise may be produced during braking.

SUMMARY

Therefore, it is an aspect of the present invention to provide an electromechanical brake system which is provided with an improved speed reducer with a reduction structure allowing change of speed, and thus may have improved responsiveness.

It is another aspect of the present invention to provide an electromechanical brake system which may reduce noise produced by the motor.

Additional aspects of the invention will be set forth in part in the description which follows and, in part, will be obvious from the description, or may be learned from practice of the invention.

In accordance with one aspect of the present invention, an electromechanical brake system includes a base carrier provided with a pair of pad plates for application of pressure to a disc installed to be movable forward and backward, a caliper housing supported by the base carrier to be movable forward and backward to apply pressure to the pad plates, a pressing member including a ball nut installed at the caliper housing to convert rotational motion into rectilinear motion to apply pressure to the pad plates and a ball screw coupled to the ball nut, a force sensor installed at the ball nut to sense load produced by operation of the ball nut, a motor to produce rotational force to operate the pressing member, and a speed reducer connected to a rotating shaft of the motor to transfer driving force to the pressing member, wherein the speed reducer may be adapted to change a reduction ratio depending on presence of load sensed by the force sensor.

The speed reducer may include a sun gear installed at the rotating shaft of the motor, a plurality of planetary gears disposed around the sun gear to be engaged with the sun gear, a carrier to rotate the ball screw connected to the planetary gears, and an internal gear unit to amplify rotational force of the motor by being engaged with the planetary gears or to transfer the rotational force to the ball screw without change in a reduction ratio.

The internal gear unit may include a first internal gear fixed to an outside of the planetary gears, a second internal gear spaced from the first internal gear and engaged with the planetary gears and the carrier, and a shifting member provided at the first internal gear to move the second internal gear forward or backward depending on presence of load sensed by the force sensor, wherein the second internal gear may move forward or backward to be engaged with the planetary gears and the carrier to transfer rotational force or to be placed between and engaged with the planetary gears and the first internal gear to amplify the rotational force.

The shifting member may include a guide rod arranged at an accommodation portion formed at the first internal gear, one end of the guide rod being curved toward the second internal gear, a guide groove formed at the second internal gear to allow the curved one end to be inserted thereinto, a support spring provided at the other end of the guide rod to press the guide rod toward the disc, and a solenoid coil to produce magnetic force from electricity applied thereto to move the guide rod toward the support spring when load is produced in the ball nut.

An inner circumferential surface of the second internal gear may be provided with first gear teeth to be engaged with gear teeth of the carrier and the planetary gears, and an outer circumferential surface of the second internal gear may be provided with second gear teeth to be engaged with gear teeth of the first internal gear.

The second internal gear may be engaged with the carrier and the planetary gears before the ball nut is brought into contact with the pad plates by rotation of the motor.

The second internal gear may move backward to be engaged with the planetary gears and the first internal gear when the ball nut is brought into contact with the pad plates.

The first internal gear may be a fixed internal gear, and the second internal gear may be a rotating internal gear to rotate by being engaged with the carrier and the planetary gears.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
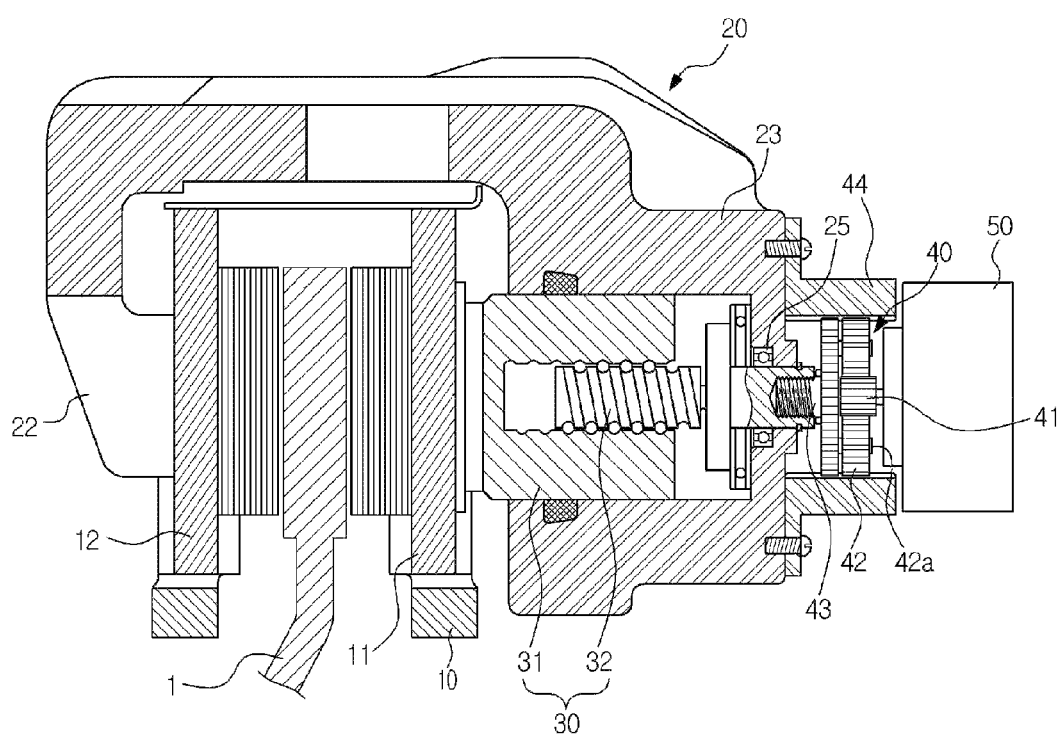
FIG. 1 is a lateral cross-sectional view schematically showing a conventional electromechanical brake system.

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications may be made without departing from the spirit of the invention.

Figure 2:
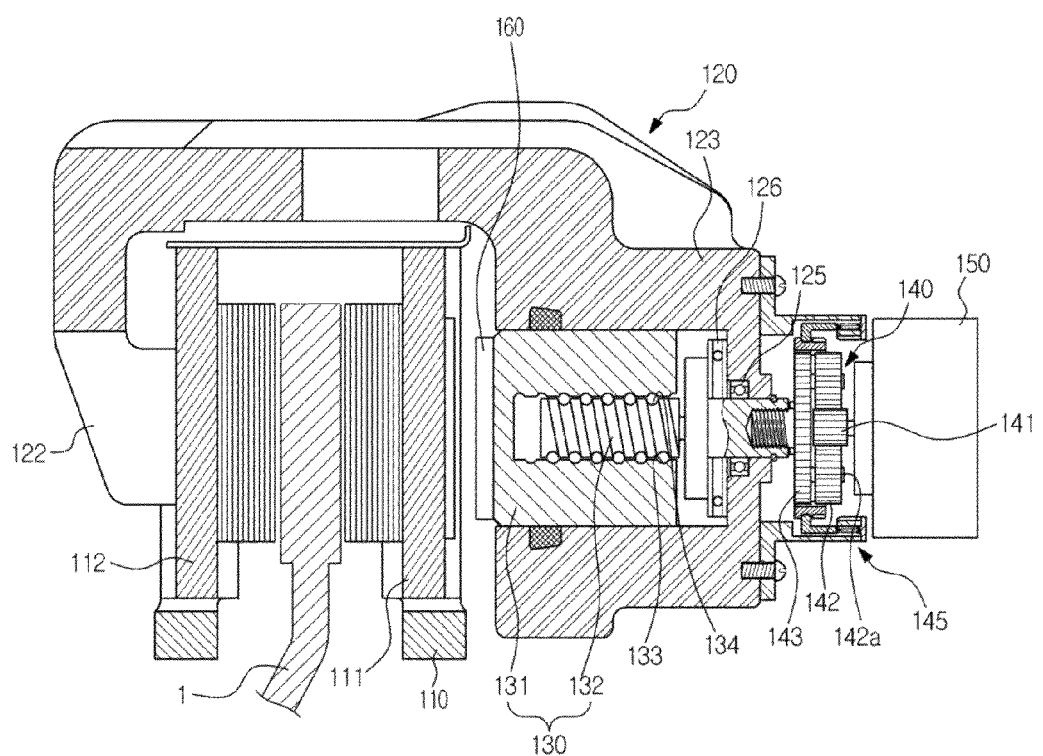
FIG. 2 is a lateral cross-sectional view schematically showing an electromechanical brake system according to an exemplary embodiment of the present invention.
Figure 3:
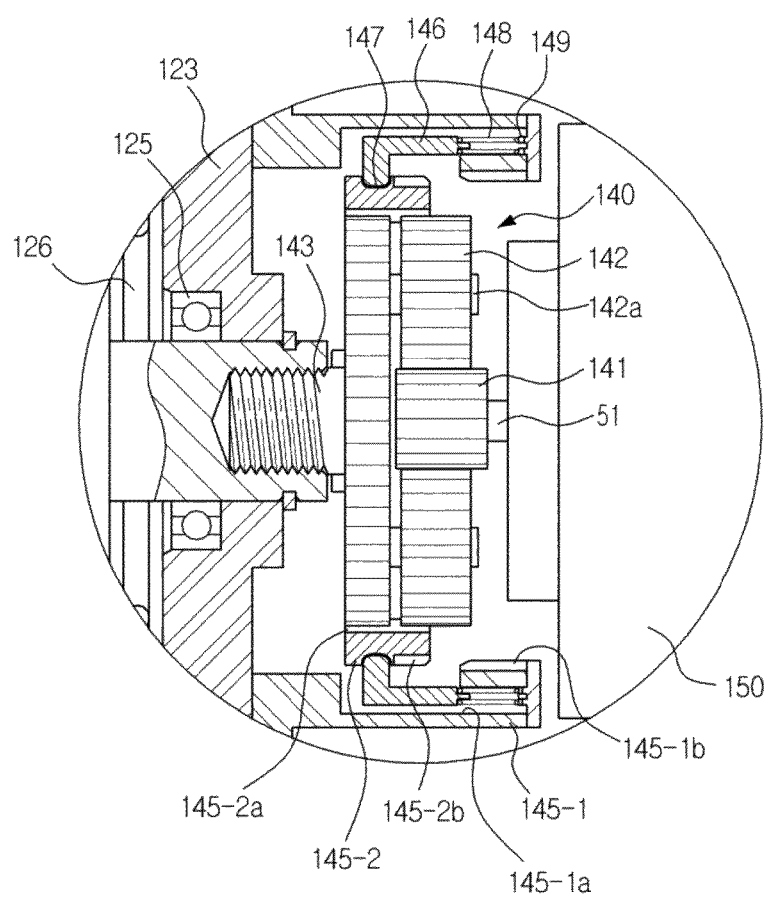
FIG. 3 is an enlarged view showing part of the electromechanical brake system of FIG. 2.
Figure 4:
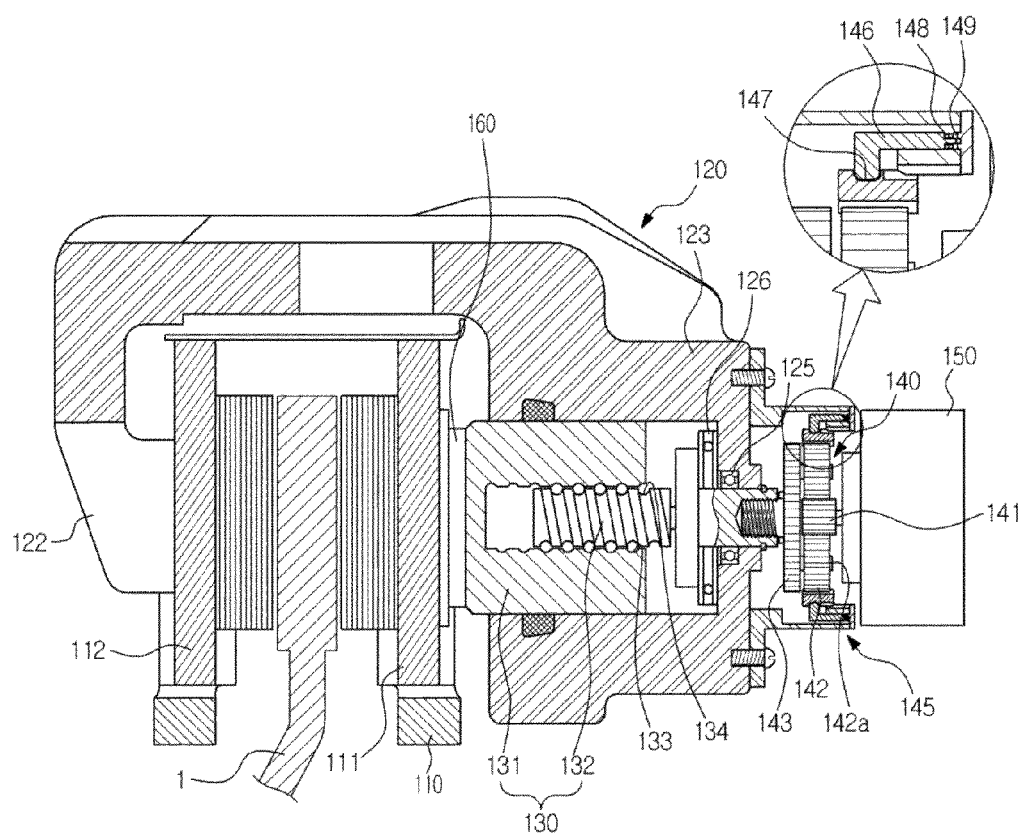
FIG. 4 is a lateral cross-sectional view illustrating change of speed in a speed reducer in the case that load is produced in the electromechanical brake system according to the exemplary embodiment.

FIG. 2 is a lateral cross-sectional view schematically showing an electromechanical brake system according to an exemplary embodiment of the present invention, FIG. 3 is an enlarged view showing part of the electromechanical brake system of FIG. 2, and FIG. 4 is a lateral cross-sectional view illustrating change of speed in a speed reducer in the case that load is produced in the electromechanical brake system according to the exemplary embodiment.

Referring to FIGS. 2 to 4, an electromechanical brake system according to the illustrated embodiment includes a disc 1 to rotate with a wheel of a vehicle, a base carrier 110 at which a pair of pad plates 111 and 112 disposed to apply pressure to both sides of the disc 1 to perform braking, a caliper housing 120 installed at the base carrier 110 to be movable forward and backward to apply pressure to the pad plates 111 and 112, a pressing member 130 installed at the caliper housing 120 to covert rotational motion into rectilinear motion, a speed reducer 140 coaxially connected to the pressing member 130, and a motor 150 to rotate the speed reducer 140 in forward and reverse directions.

The pad plates 111 and 112 are divided into an inner pad plate 111 disposed to adjoin the pressing member 130, and an outer pad plate 112 disposed to a finger 122, which will be described later. The pad plates 111 and 112 are movably installed at the base carrier 110 fixed to a vehicle body so as to be movable toward and away from both sides of the disc 1. The caliper housing 120 is also installed at the base carrier 110 to be movable forward and backward in the direction of application of pressure to the pad plates 111 and 112.

A body 123 having the pressing member 130 installed therein is provided at the rear side of the caliper housing 120, and a finger 122 downwardly curved to operate the outer pad plate 112 is provided at the front side of the caliper housing 120 and integrated with the body 123.

The pressing member 130 is provided with a ball screw 132 screw-coupled to a central rotating shaft of a carrier 143 of the speed reducer 140, which will be described later, to receive rotational force of the motor 150, and a ball nut 131 coupled to the ball screw 132 to apply pressure to the inner pad plate 111 with rectilinear motion.

The ball nut 131 is installed in the body 123 such that the ball nut 131 is movable forward and backward with rotation thereof limited. The structure to limit rotation of the ball nut 131 may be realized by forming the outer surface of the pressing member 130 and the corresponding inner surface of the body 123 coupled to the pressing member 130 in a polygonal shape or by installing a key and a guide member (not shown) formed in the shape of a key recess at the outer surface of the pressing member 130 and the inner surface of the body 123. The ball nut 131 applies pressure to the disc 1 by contacting the inner pad plate 111.

The ball screw 132 is installed through the body 123 to be disposed in the body 123, and is rotatably arranged in the body 123 to be parallel to the direction in which the ball nut 131 moves forward and backward. The ball screw 132 and the ball nut 131 are provided with grooves 133 and 134 formed in a semicircle shape to allow a plurality of balls to move therein. Here, a roller screw may be used instead of the ball screw 132.

To support the ball screw 132 as above, a first bearing 125 and a second bearing 126 are installed at mutually spaced positions in the body 123. The first bearing 125 supports the ball screw 132 such that the ball screw 132 is rotatable. The second bearing 126, which is a thrust bearing, receives reaction force produced in the direction of forward and backward movement of the ball nut 131 and transferred via the ball screw 132 during braking.

Meanwhile, a force sensor 160 is provided at the side of the ball nut 131 facing in the direction of forward movement of the ball nut 131. The force sensor 160 senses load according to movement of the ball nut 131 during braking. Here, the distance of forward movement of the ball nut 131 which receives rotational force of the motor 150 and moves is divided into a no-load section in which the ball nut 131 does not contact the inner pad plate 111, and a load section in which the ball nut 131 applies pressure to the inner pad plate 111 and substantially produces braking force. That is, the force sensor 160 senses transition from the no-load section to the load section and outputs a signal to the speed reducer 140, thereby allowing change of speed of the speed reducer 140. Such a speed change structure will be described in more detail below. The force sensor 160 is a commonly known technology and thus a detailed description thereof will be omitted.

The speed reducer 140 according to the illustrated embodiment includes a sun gear 141 installed at a rotating shaft 151 of the motor 150, a plurality of planetary gears 142 disposed around the sun gear 141 to be engaged with the sun gear 141, the carrier 143 connected to a shaft 142a of each of the planetary gears 142 to rotate the pressing member 130, an internal gear unit 145 including a first internal gear 145-1 fixed to an outside of the planetary gears 142 and a second internal gear 145-2 engaged with the planetary gears 142 and the carrier 143, and a shifting member to move the second internal gear 145-2 forward and backward.

The internal gear unit 145 is adapted to amplify rotational force of the motor 150 according to forward and backward movement of the second internal gear 145-2 and transfer the amplified force to the ball screw 132 or to transfer the rotational force of the motor 150 without change in a reduction ratio.

More specifically, the first internal gear 145-1 is a fixed internal gear. That is, the first internal gear 145-1 is fixed to an outer side of the body 123 and arranged outside the planetary gears 142. At this time, the gear teeth 145-1b of the first internal gear 145-1 are spaced a certain distance from the planetary gears 142 so as not to be engaged with the planetary gears 142. An accommodation portion 145-1a is formed at the first internal gear 145-1 to allow installation of a guide rod 146 of the shifting member, which will be described later.

The second internal gear 145-2 is a rotating internal gear which rotates while being spaced from the first internal gear 145-1. That is, the second internal gear 145-2 is formed in a ring shape and engaged with the carrier 143 and the planetary gears 142. Here, the inner circumferential surface of the second internal gear 145-2 is provided with first gear teeth 145-2a engaged with the carrier 143 and the planetary gears 142, while the outer circumferential surface of the second internal gear 145-2 is provided with second gear teeth 145-2b engaged with the gear teeth 145-1b of the first internal gear 145-1. The first gear teeth 145-2a and the gear teeth of the carrier 143 and the planetary gears 142 are collinearly arrange, while the second gear teeth 145-2b and the gear teeth 145-1b of the first internal gear 145-1 are collinearly arranged.

In addition, the second internal gear 145-2 is provided with a guide groove 147 into which the guide rod 146 described above is inserted. That is, the second internal gear 145-2 is adapted to move along with movement of the guide rod 146 inserted into the guide groove 147.

In the illustrated embodiment, the shifting member is adapted to move the second internal gear 145-2 forward or backward according to load to the ball nut 131 sensed by the force sensor 160. Such a shifting member is provided with the guide rod 146 arranged at the accommodation portion 145-1a, which is formed at the first internal gear 145-1, the guide groove 147 formed at the second internal gear 145-2 to allow one end of the guide rod 146 to be inserted thereinto, a support spring 148 provided at the other end of the guide rod 146, and a solenoid coil 149 to produce magnetic force from electric power applied thereto.

The guide rod 146 has a predetermined length, and one end thereof is curved toward the second internal gear 145-2. That is, the one end of the guide rod 146 is inserted into the guide groove 147 formed at the second internal gear 145-2.

As the support spring 148 is provided at the other end of the guide rod 146, the guide rod 146 is pressed toward the disc 1 by the support spring 148. Thereby, the second internal gear 145-2 remains engaged with the carrier 143 and the planetary gears 142 before the ball nut 131 comes into contact with the inner pad plate 111 according to rotation of the motor 150.

Meanwhile, a solenoid coil 149 to produce magnetic force from electric power applied thereto is provided at an end of the support spring 148. When magnetic force is produced, the guide rod 146 is moved toward the support spring 148. That is, as shown in FIG. 4, the second internal gear 145-2 moves along with the guide rod 146, and thereby the first gear teeth 145-2a of the second internal gear 145-2 are engaged with the planetary gears 142, and the second gear teeth 145-2b are engaged with the gear teeth 145-1b of the first internal gear 145-1.

Additionally, the time at which electric power is applied to the solenoid coil 149 is the same as the time at which load is produced in the ball nut 131. That is, when the ball nut 131 reaches and applies pressure to the inner pad plate 111, axial force is produced and load produced in the ball nut 131 increases. Then, electric power is applied to the solenoid coil 149 to generate magnetic force. Accordingly, the second internal gear 145-2 is fixed to the fixed first internal gear 145-1, and brought into contact with the planetary gears 142. Then, the planetary gears 142 revolves, and the revolution of the planetary gears 142 is transferred to the ball screw 132 via the carrier 143, causing reduced rotation of the ball screw 132. That is, torque of the motor 150 is amplified by the reduction ratio (gear ratio) of the planetary gears 142 to produce axial force to obtain necessary braking force.

Meanwhile, as described above, by being engaged with the planetary gears 142 and the carrier 143 before the ball nut 131 to apply axial force to the inner pad plate 111 comes into contact with the inner pad plate 111, the second internal gear 145-2 rotates the ball screw 132 at the rotation speed of the motor 150 without change in the reduction ratio of the planetary gears 142, reducing the time taken for the ball nut 131 to reach the inner pad plate 121.

Hereinafter, operation of the electromechanical brake system having the structure as above will be described.

When the motor 150 rotates to perform braking, causing the speed reducer 140 connected to the motor 150 to rotate. The speed reducer 140 rotated by rotational force of the motor 150 amplifies rotational force of the motor 150 transferred to the ball screw 132 or simply transfers rotational force of the motor 150 without change in the reduction ratio. The ball screw 132 rotates the ball nut 131, causing the ball nut 131 to reach the inner pad plate 111. Then, the inner pad plate 111 is pressed toward the disc 1 by the ball nut 131.

Specifically, the motor 150 rotates the sun gear 141 connected to the rotating shaft 151 of the motor 150. The sun gear 141 in turn rotates the planetary gears 142 engaged with the sun gear 141. The planetary gears 142 rotate the carrier 143 connected to the shafts 142a of the planetary gears 142 and the second internal gear 145-2. The carrier 143 rotates the ball screw 132 screw-coupled thereto.

Through the above operations, the planetary gears 142 and the carrier 143 are both engaged with the second internal gear 145-2, and thereby the ball screw 132 receives rotation from the motor 150 and rotates at the rotation speed of the motor 150 without change in the reduction ratio of the planetary gears 142.

That is, in the illustrated embodiment, the ball screw 132 is allowed to rotate at the rotation speed of the motor 150 without change in the reduction ratio of the planetary gears 142, and therefore the time taken for the ball nut 131 to reach the inner pad plate 111 may be reduced.

In addition, in the above operations, when the ball nut 131 reaches the inner pad plate 111 through continuous rotation of the ball screw 132, reaction force is produced by application of pressure to the inner pad plate 111 and thereby load is produced in a ball nut 131 and electric current applied to the motor 150 increases. Thereby, electric power is applied to the solenoid coil 149, producing magnetic force. By the magnetic force, the guide rod 146 engaged with the guide groove 147 of the second internal gear 145-2 and the second internal gear 145-2 are moved together.

That is, as shown in FIG. 4, the second internal gear 145-2 is placed between and engaged with the planetary gears 142 and the first internal gear 145-1. Thereby, the ball screw 132 amplifies the torque of the motor 150 by the reduction ratio of the planetary gears 142, producing axial force.

That is, driving force of the motor 150 is amplified via the speed reducer 140 and then transferred to the ball screw 132. Then, according to the direction of rotation of the ball screw 132, the ball nut 131 rectilinearly reciprocates, pressing the inner pad plate 111 toward the disc 1 and causing the caliper housing 120 to slide to force the outer pad plate 112 to contact the disc 1. Thereby, braking is performed.

Meanwhile, when no load is produced in the ball nut 131, i.e., when the ball nut 131 is free from load, electric power applied to the solenoid coil 149 is shut off. Then, the guide rod 146 is returned to an original position by the support spring 148 provided at the other end of the guide rod 146. That is, as shown in FIG. 2, when the guide rod 146 returns to the original position thereof, the second internal gear 145-2 also moves to be engaged with the carrier 143 and the planetary gears 142.

Consequently, in the process of applying pressure to the inner pad plate 111 according to rotation of the motor 150 according to the illustrated embodiment, the second internal gear 145-2 is engaged with the carrier 143 and the planetary gears 142 and allowed to transfer the rotation speed of the motor 150 to the ball screw 132 without change in the reduction ratio of the planetary gears 142 in the no-load section in which the ball nut 131 does not contact the inner pad plate 111. In the load section in which the ball nut 131 contacts the inner pad plate 111 and thus reaction force is produced, the second internal gear 145-2 is moved backward by magnetic force, placed between and engaged with the planetary gears 142 and the first internal gear 145-1 to amplify the torque of the motor 150 by the reduction ratio of the planetary gears 142 and transfer the amplified torque to the ball screw 132. That is, by allowing speed to be reduced only in the section in which reaction force is produced, responsiveness of the electromechanical brake system may be improved.

As is apparent from the above description, an electromechanical brake system according to the present invention is provided with a speed reducer allowing change of speed to allow driving force of the motor to be transferred without change in the reduction ratio in a section in which no load is produced and to allow rotational force of the motor to be amplified and transferred in a section in which load is produced. Therefore, responsiveness in braking may be improved.

In addition, by allowing rotational force of the motor to be amplified only in the section in which load is produced, noise produced in braking may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electromechanical brake system comprising:
   a base carrier provided with a pair of pad plates for application of pressure to a disc, the pad plates installed to be movable forward and backward;
   a caliper housing supported by the base carrier to be movable forward and backward to apply pressure to the pad plates;
   a pressing member including a ball nut installed at the caliper housing to convert rotational motion into rectilinear motion to apply pressure to the pad plates and a ball screw coupled to the ball nut;
   a force sensor installed at the ball nut to sense load produced by operation of the ball nut;
   a motor to produce rotational force to operate the pressing member; and
   a speed reducer connected to a rotating shaft of the motor to transfer driving force to the pressing member,
   wherein the speed reducer is adapted to change a reduction ratio depending on presence of the load sensed by the force sensor,
   wherein the speed reducer comprises:
   a sun gear installed at the rotating shaft of the motor;
   a plurality of planetary gears disposed around the sun gear to be engaged with the sun gear;
   a carrier to rotate the ball screw connected to the planetary gears; and
   an internal gear unit to amplify rotational force of the motor by being engaged with the planetary gears or to transfer the rotational force to the ball screw without change in a reduction ratio,
   wherein the internal gear unit comprises:
   a first internal gear fixed to an outside of the planetary gears;
   a second internal gear spaced from the first internal gear and engaged with the planetary gears and the carrier; and
   a shifting member provided at the first internal gear to move the second internal gear forward or backward depending on presence of load sensed by the force sensor, and
   wherein the second internal gear moves forward or backward to be engaged with the planetary gears and the carrier to transfer rotational force or to be placed between and engaged with the planetary gears and the first internal gear to amplify the rotational force.

2. The electromechanical brake system according to claim 1, wherein the shifting member comprises:
   a guide rod arranged at an accommodation portion formed at the first internal gear, one end of the guide rod being curved toward the second internal gear;
   a guide groove formed at the second internal gear to allow the curved one end to be inserted thereinto;
   a support spring provided at the other end of the guide rod to press the guide rod toward the disc; and
   a solenoid coil to produce magnetic force from electricity applied thereto to move the guide rod toward the support spring when load is produced in the ball nut.

3. The electromechanical brake system according to claim 1, wherein an inner circumferential surface of the second internal gear is provided with first gear teeth to be engaged with gear teeth of the carrier and the planetary gears, and an outer circumferential surface of the second internal gear is provided with second gear teeth to be engaged with gear teeth of the first internal gear.

4. The electromechanical brake system according to claim 1, wherein the second internal gear is engaged with the carrier and the planetary gears before the ball nut is brought into contact with the pad plates by rotation of the motor.

5. The electromechanical brake system according to claim 1, wherein the second internal gear moves backward to be engaged with the planetary gears and the first internal gear when the ball nut is brought into contact with the pad plates.

6. The electromechanical brake system according to claim 1, wherein:
    the first internal gear is a fixed internal gear; and
    the second internal gear is a rotating internal gear to rotate by being engaged with the carrier and the planetary gears.

* * * * *